(12) United States Patent
Lovorn et al.

(10) Patent No.: US 10,294,742 B2
(45) Date of Patent: May 21, 2019

(54) BOREHOLE PRESSURE MANAGEMENT METHODS AND SYSTEMS WITH ADAPTIVE LEARNING

(71) Applicant: HALLIBURTON ENERGY SERVICES, INC., Houston, TX (US)

(72) Inventors: James Randolph Lovorn, Tomball, TX (US); Saad Saeed, Houston, TX (US); Isabel Cristina Poletzky, Cypress, TX (US); Nancy Suzan Davis, Glen Rose, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 18 days.

(21) Appl. No.: 14/917,559

(22) PCT Filed: Nov. 15, 2013

(86) PCT No.: PCT/US2013/070242
§ 371 (c)(1),
(2) Date: Mar. 8, 2016

(87) PCT Pub. No.: WO2015/073017
PCT Pub. Date: May 21, 2015

(65) Prior Publication Data
US 2016/0222741 A1    Aug. 4, 2016

(51) Int. Cl.
*E21B 21/08*    (2006.01)
*G05B 13/04*    (2006.01)
(Continued)

(52) U.S. Cl.
CPC .............. *E21B 21/08* (2013.01); *E21B 34/00* (2013.01); *E21B 44/00* (2013.01); *E21B 47/06* (2013.01);
(Continued)

(58) Field of Classification Search
CPC ... G05B 13/0265; G05B 13/048; E21B 21/08; E21B 44/00; E21B 34/00; E21B 47/06
(Continued)

(56) References Cited

U.S. PATENT DOCUMENTS 6,747,570 B2 * 6/2004 Beique .................... E21B 17/14
166/250.1
7,191,850 B2 * 3/2007 Williams .................. E21B 7/04
175/45

(Continued)

FOREIGN PATENT DOCUMENTS

WO    2012/027245    3/2012
WO    2015/073017    5/2015

OTHER PUBLICATIONS

Haravinthan et al., "A Review on Prediction of Abnormal Geo-Pressure via Seismic Travel Time and Wire Line Log Correlation Modeling Using Neural Network", 2011, International Journal of Information and Electronics Engineering 1.3, pp. 195-199.*

(Continued)

*Primary Examiner* — Juan C Ochoa
(74) *Attorney, Agent, or Firm* — John W. Wustenberg; Parker Justiss, P.C.

(57) ABSTRACT

Various managed pressure drilling tools, systems, and methods are disclosed. An example method includes obtaining a model-based pressure prediction and sensor-based pressure measurements during borehole drilling operations. The method also includes determining a real-time learning calculation using the model-based pressure prediction and at least some of the sensor-based pressure measurements. The method also includes updating a formation pressure model based at least in part on the real-time learning calculation. The method also includes controlling annular pressure for (Continued)

the borehole drilling operations based on a pressure predicted by the updated formation pressure model.

18 Claims, 8 Drawing Sheets

(51) Int. Cl.
    *E21B 44/00*     (2006.01)
    *E21B 47/06*     (2012.01)
    *G05B 13/02*     (2006.01)
    *E21B 34/00*     (2006.01)

(52) U.S. Cl.
    CPC ....... *G05B 13/0265* (2013.01); *G05B 13/048* (2013.01)

(58) Field of Classification Search
    USPC ...................................................... 703/10, 2
    See application file for complete search history.

(56) References Cited

U.S. PATENT DOCUMENTS

| | | | |
|---|---|---|---|
| 7,274,992 B2 | 9/2007 | Dewhurst et al. | |
| 8,527,249 B2 * | 9/2013 | Jamison | E21B 44/02 703/10 |
| 9,328,573 B2 * | 5/2016 | Standifird | E21B 21/08 |
| 9,598,947 B2 * | 3/2017 | Wang | E21B 44/00 |
| 9,695,655 B2 * | 7/2017 | Kaasa | E21B 21/08 |
| 2003/0110018 A1 * | 6/2003 | Dutta | G01V 1/282 703/10 |
| 2006/0207795 A1 | 9/2006 | Kinder et al. | |
| 2010/0121623 A1 * | 5/2010 | Yogeswaren | G01V 11/00 703/2 |
| 2011/0011595 A1 * | 1/2011 | Huang | E21B 43/00 166/369 |
| 2011/0139506 A1 | 6/2011 | Lovorn et al. | |
| 2011/0290562 A1 | 12/2011 | Standifird et al. | |
| 2012/0080197 A1 * | 4/2012 | Dickens | G01V 3/083 166/369 |
| 2012/0247831 A1 | 10/2012 | Kaasa et al. | |
| 2013/0138410 A1 * | 5/2013 | Yogeswaren | G01V 11/00 703/2 |
| 2014/0076632 A1 * | 3/2014 | Wessling | E21B 47/06 175/48 |

OTHER PUBLICATIONS

Nader C. Dutta, "Geopressure detection using reflection seismic data and rock physics principles: methodology and case histories from deepwater tertiary Clastics Basins", SPE Asia Pacific Oil and Gas Conference and Exhibition, Society of Petroleum Engineers, pp. 1-7 (Year: 2002).*

Stefan Wessling et al., "Calibrating Automated Event Detection Algorithms for Real-Time Wellbore Stability Applications", 2013, SPE/IADC Drilling Conference, Society of Petroleum Engineers, pp. 1-11.*

Anne Bartetzko et al., "Uncertainty Quantification of Real-Time Pore Pressure Models Caused by Normal Compaction Trendline Setting", 2012, IADC/SPE Drilling Conference and Exhibition, Society of Petroleum Engineers, pp. 1-8.*

Dutta, N.C., "Geopressure Prediction Using Seismic Data: Current Status and the Road Ahead," Geophysics, vol. 67, No. 6 (Nov.-Dec. 2002), p. 2012-2041.

Haravinthan, A., et al., "A Review on Prediction of Abnormal Geo-Pressure via Seismic Travel Time and Wire Line Log Correlation Modeling Using Neural Network," International Journal of Information and Electronics Engineering, vol. 1, No. 3, Nov. 2011, p. 195-199.

PCT International Search Report and Written Opinion, dated Aug. 27, 2014, Appl No. PCT/US2013/70242, "Borehole Pressure Management Methods and Systems with Adaptive Learning," Filed Nov. 15, 2013, 12 pgs.

PCT International Report on Patentability, dated Nov. 9, 2015, Appl No. PCT/US2013/70242, "Borehole Pressure Management Methods and Systems with Adaptive Learning," Filed Nov. 15, 2013, 14 pgs.

* cited by examiner

EVENT SIGNATURES

| PARAMETERS | KICK | LOSS | CONNECTION STARTED | CONNECTION FINISHED |
|---|---|---|---|---|
| STANDPIPE PRESSURE | DECREASING | INCREASING | DECREASING | INCREASING |
| UPSTREAM CHOKE PRESSURE | DECREASING | INCREASING | DECREASING | INCREASING |
| DOWNSTREAM CHOKE PRESSURE | UNCHANGED | UNCHANGED | DECREASING | INCREASING |
| BELOW BOP PRESSURE | DECREASING | INCREASING | DECREASING | INCREASING |
| ANNULUS PRESSURE | DECREASING | INCREASING | DECREASING | INCREASING |
| BOTTOM HOLE PRESSURE | DECREASING | ERRATIC | DECREASING | INCREASING |
| SEPARATOR PRESSURE | UNCHANGED | UNCHANGED | UNCHANGED | UNCHANGED |
| BACKPRESSURE PUMP PRESSURE | DECREASING | INCREASING | INCREASING | DECREASING |
| UPSTREAM CHOKE TEMPERATURE | DECREASING | UNCHANGED | DECREASING | INCREASING |
| DOWNSTREAM CHOKE TEMPERATURE | DECREASING | UNCHANGED | DECREASING | INCREASING |
| BOTTOMHOLE TEMPERATURE | DECREASING | UNCHANGED | UNCHANGED | INCREASING |
| FLOW IN | UNCHANGED | UNCHANGED | DECREASING | INCREASING |
| FLOW OUT | INCREASING | DECREASING | DECREASING | INCREASING |
| BACKPRESSURE PUMP RATE | DECREASING | INCREASING | INCREASING | DECREASING |
| BIT DEPTH | N/A | N/A | ERRATIC | ERRATIC |
| RATE OF PENETRATION | N/A | N/A | DECREASING | INCREASING |
| HOOKLOAD | INCREASING | N/A | ERRATIC | ERRATIC |
| WEIGHT ON BIT | INCREASING | N/A | DECREASING | INCREASING |
| RPM | UNCHANGED | N/A | DECREASING | INCREASING |
| TORQUE | ERRATIC | N/A | DECREASING | INCREASING |
| CHOKE SIZE | INCREASING | DECREASING | DECREASING | INCREASING |
| PIT VOLUME | INCREASING | DECREASING | UNCHANGED | UNCHANGED |
| TRIP TANK | INCREASING | DECREASING | UNCHANGED | UNCHANGED |
| MUD WEIGHT IN | UNCHANGED | UNCHANGED | UNCHANGED | UNCHANGED |
| MUD WEIGHT OUT | DECREASING | UNCHANGED | UNCHANGED | UNCHANGED |
| FLOW OUT−FLOW IN | INCREASING | DECREASING | DECREASING | INCREASING |

BOREHOLE PRESSURE MANAGEMENT METHODS AND SYSTEMS WITH ADAPTIVE LEARNING

FIELD OF THE INVENTION

Not Applicable

BACKGROUND

In managed pressure borehole operations, the wellbore pressure is controlled using a closed annulus and a mechanism for regulating pressure in the annulus. The annulus may be closed during drilling through use of a rotating control device (RCD) or pressure control device (PCD), which seals the drill pipe as the wellbore is being drilled. Efforts to improve pressure and flow control during managed pressure borehole operations are ongoing.

BRIEF DESCRIPTION OF THE DRAWINGS

Accordingly, there are disclosed in the drawings and the following description borehole pressure management systems and methods with adaptive learning. In the drawings:

FIG. 7 shows an illustrative event signature chart.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

BRIEF SUMMARY OF THE INVENTION

Not Applicable

DETAILED DESCRIPTION

Disclosed herein are systems and methods for managing borehole pressure using adaptive learning. The adaptive learning is used, for example, to update the formation pressure model used to predict borehole pressure (e.g., pore pressure and/or fracture pressure) at a given depth and/or to update how available sensor-based pressure measurements are used to make the prediction. To update the formation pressure model, an adaptive learning system determines real-time learning calculations using a model-based pressure prediction and sensor-based pressure measurements obtained during borehole operations. The real-time learning calculations are used to update the formation pressure model.

The disclosed adaptive learning system operates on new data collected in real-time or near-real-time to produce real-time learning calculations. The new data may correspond to sensor-based measurements (e.g., curves, logs, estimates), detectable events, operator inputs, or other data that was previously unavailable to the adaptive learning system. The new data can be used in a training data set, a validation data set, or other data set employed by the adaptive learning system to determine outputs. Examples of the real-time learning calculations include adaptive learning weights, predicted formation parameter values, and/or predicted control parameters related to borehole pressure management. That is, the real-time learning calculations are values that are obtained dynamically by a module that itself is dynamically updated or adapted in response to the new data as the new data becomes available.

For example, to update how available sensor-based pressure measurements are used, an adaptive learning module may compare sensor-based pressure measurements (e.g., pore pressure and fracture pressure) against each other and/or against other criteria. The comparison results are used to determine which sensor-based pressure measurements and/or which portions of sensor-based pressure measurements will be input to the adaptive learning module for the formation pressure model update process. In at least some embodiments, the updated formation pressure model is based at least in part on filtered data corresponding to compaction trend data, historical pressure test data, real-time pressure test data, and/or event detection data.

With the updated formation pressure model, pore pressure and fracture pressure predictions for a segment along the borehole path are made. The pressure in the borehole during borehole operations in the segment can be controlled based on the pore pressure and fracture pressure predictions. The process of updating the formation pressure model and/or how available sensor-based pressure measurements are used may continue as borehole operations progress. Further, updated formation pressure models may be stored and organized for use as a baseline for future projects. Example borehole operations or projects that may benefit from the disclosed borehole pressure management techniques include managed pressure drilling (MPD), cementing, casing, and tripping.

Figure 1:
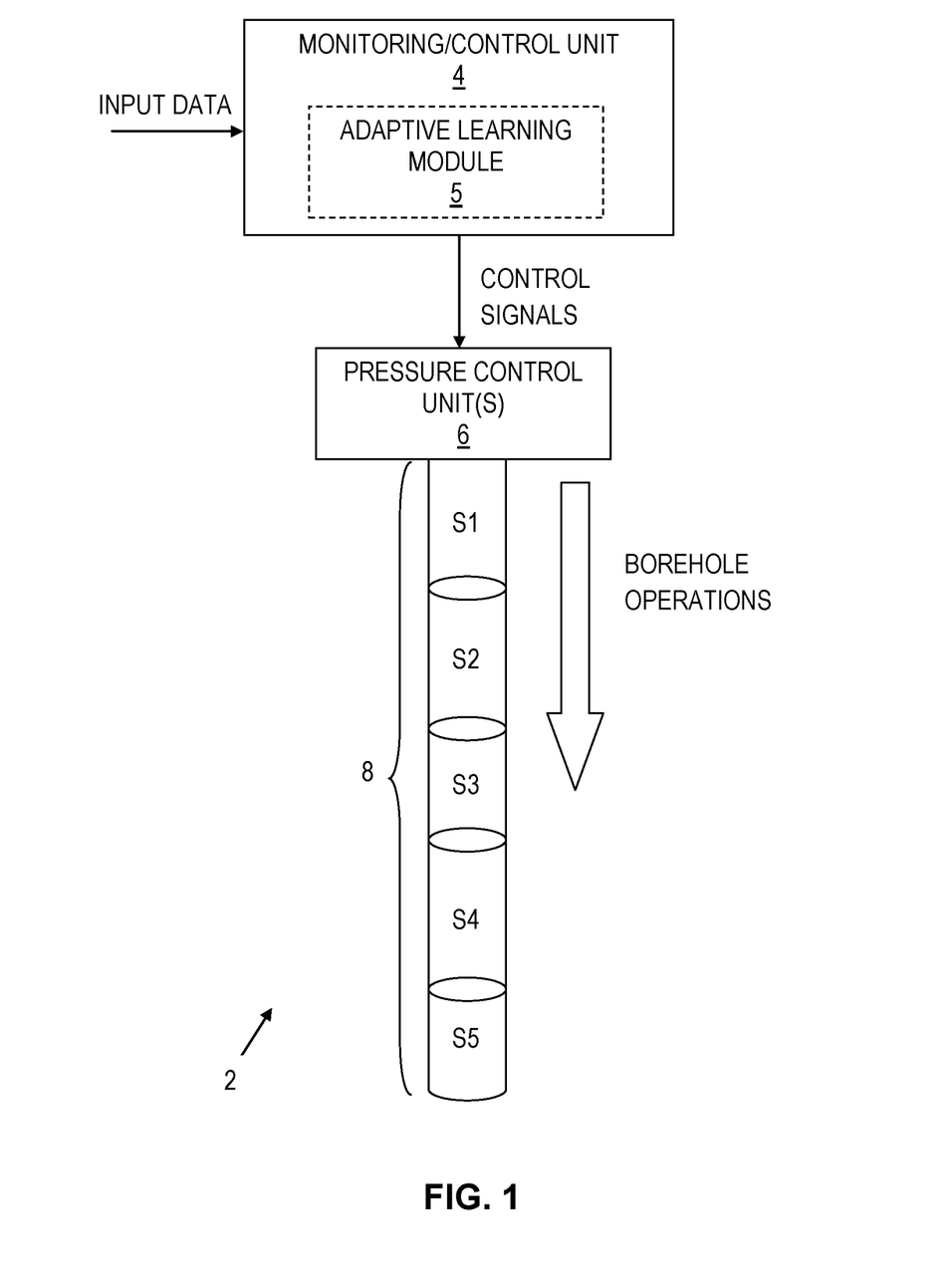
FIG. 1 shows an illustrative borehole pressure management system.

FIG. 1 shows an illustrative borehole pressure management system 2. As shown, the system 2 includes a monitoring/control unit 4 that receives input data and that outputs control signals to pressure control unit(s) 6. In at least some embodiments, the monitoring/control unit 4 includes an adaptive learning module 5 to determine real-time learning calculations that are used to update a formation pressure model as described herein. The updated formation pressure model is used to predict a pressure in a borehole 8 having different segments (labeled S1-S5). During borehole operations, control signals are provided to pressure control unit(s) 6 from the monitoring/control unit 4 to control pressure throughout the borehole 8 or in a particular segment. In some embodiments, the borehole operations may proceed downward as shown such as for MPD operations. Other examples of borehole operations for which pressure management is employed include cementing, casing, and tripping.

Figure 2:
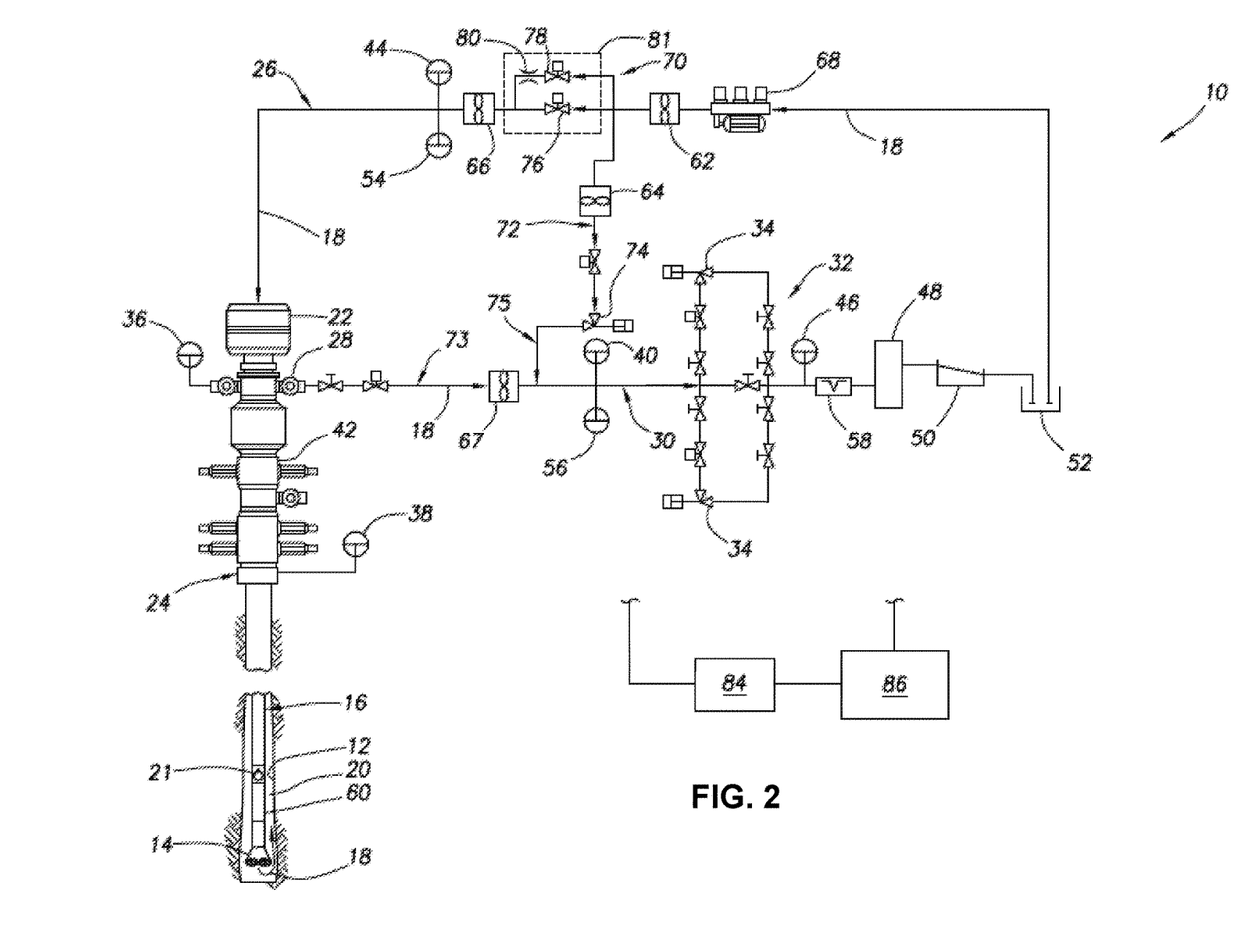
FIG. 2 shows an illustrative managed pressure drilling (MPD) system.

FIG. 2 shows an illustrative MPD system 10 which can incorporate principles of the present disclosure. In the system 10, a borehole 12 is drilled by rotating a drill bit 14 on an end of a drill string 16. In an alternative embodiment, coiled tubing or another tubular can be employed instead of drill string 16. Drilling fluid 18, commonly known as mud, is circulated downward through the drill string 16, out the drill bit 14 and upward through an annulus 20 formed between the drill string and the borehole 12, in order to cool the drill bit 14, lubricate the drill string 16, remove cuttings and provide a measure of annular pressure control. A non-return valve 21 (typically a flapper-type check valve) prevents flow of the drilling fluid 18 upward through the drill string 16. As an example, such flows may occur when connections are being made in the drill string 16.

Control of annular pressure is very important in MPD operations, where the annular pressure should be accurately controlled to prevent excessive loss of fluid into the earth formation surrounding the borehole 12, undesired fracturing of the formation, undesired influx of formation fluids into the borehole 12, etc. For MPD operations, the goal is to maintain an annular pressure greater than the pore pressure of the formation and less than the fracture pressure of the formation. Meanwhile, in underbalanced drilling, an annular pressure somewhat less than the pore pressure is maintained, thereby obtaining a controlled influx of fluid from the formation. To control annular pressure, gasses (e.g., nitrogen) or lighter weight fluids, may be added to the drilling fluid 18.

In the system 10, additional control over the annular pressure is obtained by closing off the annulus 20. Closing off annulus 20 isolates it from communication with the atmosphere and enabling the annulus 20 to be pressurized at or near the surface using a rotating control device 22 (RCD). The RCD 22 seals the drill string 16 above a wellhead 24. Although not shown in FIG. 1, the drill string 16 would extend upwardly through the RCD 22 for connection to, for example, a rotary table (not shown), a standpipe line 26, a kelley (not shown), a top drive and/or other conventional drilling equipment.

The drilling fluid 18 exits the wellhead 24 via a wing valve 28 in communication with the annulus 20 below the RCD 22. The fluid 18 then flows through drilling fluid return lines 30, 73 to a choke manifold 32, which includes redundant chokes 34. Only one of the redundant chokes 34 need be used at a time. Backpressure is applied to the annulus 20 by variably restricting flow of the fluid 18 through the operative choke(s) 34.

The greater the restriction to flow through the choke 34, the greater the backpressure applied to the annulus 20. Thus, annular pressure can be conveniently regulated by varying the backpressure applied to the annulus 20. The formation pressure model and/or a hydraulic model can be used to determine a pressure applied to the annulus 20 at or near the surface which will result in a desired annular pressure. In this manner, an operator (or an automated control system) can readily determine how to regulate the pressure applied to the annulus 20 at or near the surface in order to obtain a desired annular pressure.

The pressure applied to the annulus 20 at or near the surface can be conveniently measured. For example, pressure applied to the annulus 20 can be measured at or near the surface via a variety of pressure sensors 36, 38, 40, each of which is in communication with the annulus 20. Pressure sensor 36 senses pressure below the RCD 22, but above a blowout preventer (BOP) stack 42. Pressure sensor 38 senses pressure in the wellhead below the BOP stack 42. Pressure sensor 40 senses pressure in the drilling fluid return lines 30, 73 upstream of the choke manifold 32. In at least some embodiments, another pressure sensor 44 senses pressure in the drilling fluid injection (standpipe) line 26. Yet another pressure sensor 46 may sense pressure downstream of the choke manifold 32, but upstream of a separator 48, shaker 50 and mud pit 52. Additional sensors include temperature sensors 54, 56, Coriolis flow meter 58, and flow meters 62, 64, 66.

In some embodiments, not all of these sensors are necessary. For example, the system 10 could include only two of the three flow meters 62, 64, 66. However, input from the sensors is useful to determine what pressure to apply to the annulus 20 during drilling operations.

Furthermore, the drill string 16 preferably includes at least one sensor 60. Such sensor(s) 60 may be of the type known to those skilled in the art as pressure while drilling (PWD), measurement while drilling (MWD) and/or logging while drilling (LWD) systems. These drill string sensor systems generally provide at least pressure measurement, and may also provide temperature measurement, detection of drill string characteristics (such as vibration, torque, rpm, weight on bit, stick-slip, etc.), formation characteristics (such as resistivity, density, etc.), fluid characteristics and/or other measurements. In at least some embodiments, the sensor(s) 60 may correspond to look-ahead and/or look-around sensors. Example look-ahead and look-around sensors such as deep resistivity sensors, sonic sensors, and/or seismic-while-drilling sensors are able to provide formation characteristics up to 100 feet or more ahead of (or around) the bit or other reference point.

Various forms of telemetry (acoustic, pressure pulse, electromagnetic, etc.) may be used to transmit the downhole sensor measurements to the surface. Alternatively, or in addition, the drill string 16 may comprise wired drill pipe for transmitting data and command signals between downhole and the surface or another remote location. To enable such communications, the wired drill pipe may have electrical conductors extending along the length of the drill pipe.

Additional sensors could be included in the system 10, if desired. For example, another flow meter 67 could be used to measure the rate of flow of the fluid 18 exiting the wellhead 24. Further, another Coriolis flow meter (not shown) could be interconnected directly upstream or downstream of a rig mud pump 68. Further, pressure and level sensors could be used with the separator 48, and level sensors could be used to indicate a volume of drilling fluid in the mud pit 52. Note that the separator 48 could be a 3 or 4 phase separator, or a mud gas separator (sometimes referred to as a "poor boy degasser"). However, the separator 48 is not necessarily used in the system 10. Further, fewer sensors could be included in the system 10, if desired. For example, the output of the rig mud pump 68 could be determined by counting pump strokes, instead of by using flow meter 62 or any other flow meters.

In operation, the drilling fluid 18 is pumped through the standpipe line 26 and into the interior of the drill string 16 by the rig mud pump 68. The pump 68 receives the fluid 18 from the mud pit 52 and conveys it via a standpipe manifold 70 to the standpipe 26. The fluid 18 then circulates downward through the drill string 16, upward through the annulus 20, through the drilling fluid return lines 30, 73, through the choke manifold 32, and then via the separator 48 and shaker 50 to the mud pit 52 for conditioning and recirculation.

In the system 10, the choke 34 is not used to control backpressure applied to the annulus 20 for control of the annular pressure, unless the fluid 18 is flowing through the choke 34. In conventional overbalanced drilling operations, such fluid flow occurs when a connection is made in the drill string 16 to add another length of drill pipe to the drill string 16 as the wellbore 12 is drilled deeper. In such case, the annular pressure is regulated solely by the density of the fluid 18 (due to the lack of fluid circulation). In some embodiments, pressure trapping techniques may be employed to control when there is no flow across choke 34.

In the system 10, it is possible to maintain flow of the fluid 18 through the choke 34 while a connection is being made in the drill string 16, even though the fluid 18 does not circulate through the drill string 16 and annulus 20. In other words, pressure can be applied to the annulus 20 by restricting flow of the fluid 18 through the choke 34, even though a separate backpressure pump may not be used. Instead, the fluid 18 is conveyed from the pump 68 to the choke manifold 32 via a bypass line 72, 75 when a connection is made in the drill string 16. Thus, the fluid 18 can bypass the standpipe line 26, drill string 16 and annulus 20, and can flow directly from the pump 68 to the mud return line 30, which remains in communication with the annulus 20. Restriction of this flow by the choke 34 will thereby cause pressure to be applied to the annulus 20.

As depicted in FIG. 2, both of the bypass line 75 and the mud return line 30 are in communication with the annulus 20 via a single line 73. However, the bypass line 75 and the mud return line 30 could instead be separately connected to the wellhead 24, for example, using an additional wing valve (e.g., below the RCD 22), in which case each of the lines 30, 75 would be directly in communication with the annulus 20. Although this might require some additional plumbing at the rig site, the effect on the annulus pressure would be essentially the same as connecting the bypass line 75 and the mud return line 30 to the common line 73. Thus, it should be appreciated that various different configurations of the components of the system 10 may be used, without departing from the principles of this disclosure.

In system 10, flow of the fluid 18 through the bypass line 72, 75 is regulated by a choke or other type of flow control device 74. Line 72 is upstream of the bypass flow control device 74, and line 75 is downstream of the bypass flow control device. Further, flow of the fluid 18 through the standpipe line 26 is substantially controlled by a valve or other type of flow control device 76. Note that the flow control devices 74, 76 are independently controllable, which provides substantial benefits to the system 10, as described more fully below.

Since the rate of flow of the fluid 18 through each of the standpipe and bypass lines 26, 72 is useful in determining how annular pressure is affected by these flows, the flow meters 64, 66 are depicted in FIG. 2 as being interconnected in these lines. However, the rate of flow through the standpipe line 26 could be determined even if only the flow meters 62, 64 were used, and the rate of flow through the bypass line 72 could be determined even if only the flow meters 62, 66 were used. Thus, it should be understood that it is not necessary for the system 10 to include all of the sensors depicted in FIG. 1 and described herein, and the system could instead include additional sensors, different combinations and/or types of sensors, etc.

In system 10, a bypass flow control device 78 and flow restrictor 80 may be used for filling the standpipe line 26 and drill string 16 after a connection is made, and equalizing pressure between the standpipe line and mud return lines 30, 73 prior to opening the flow control device 76. Otherwise, sudden opening of the flow control device 76 prior to the standpipe line 26 and drill string 16 being filled and pressurized with the fluid 18 could cause an undesirable pressure transient in the annulus 20 (e.g., due to flow to the choke manifold 32 temporarily being lost while the standpipe line and drill string fill with fluid).

By opening the standpipe bypass flow control device 78 after a connection is made, the fluid 18 is permitted to fill the standpipe line 26 and drill string 16 while a substantial majority of the fluid continues to flow through the bypass line 72, thereby enabling continued controlled application of pressure to the annulus 20. After the pressure in the standpipe line 26 has equalized with the pressure in the mud return lines 30, 73 and bypass line 75, the flow control device 76 can be opened, and then the flow control device 74 can be closed to slowly divert a greater proportion of the fluid 18 from the bypass line 72 to the standpipe line 26.

Before a connection is made in the drill string 16, a similar process can be performed, except in reverse, to gradually divert flow of the fluid 18 from the standpipe line 26 to the bypass line 72 in preparation for adding more drill pipe to the drill string 16. That is, the flow control device 74 can be gradually opened to slowly divert a greater proportion of the fluid 18 from the standpipe line 26 to the bypass line 72, and then the flow control device 76 can be closed.

Note that the flow control device 78 and flow restrictor 80 could be integrated into a single element such as a flow control device having a flow restriction therein. Meanwhile, the flow control devices 76, 78 could be integrated into a single flow control device 81 such as a single choke which can gradually open to slowly fill and pressurize the standpipe line 26 and drill string 16 after a drill pipe connection is made, and then opens fully to allow maximum flow while drilling. However, since typical conventional drilling rigs are equipped with the flow control device 76 in the form of a valve in the standpipe manifold 70, and use of the standpipe valve is incorporated into usual drilling practices, the individually operable flow control devices 76, 78 are presently preferred. The flow control devices 76, 78 are at times referred to collectively below as though they are the single flow control device 81, but it should be understood that the flow control device 81 can include the individual flow control devices 76, 78.

Note that the system 10 could include a backpressure pump (not shown) for applying pressure to the annulus 20 and drilling fluid return line 30 upstream of the choke manifold 32, if desired. The backpressure pump could be used instead of, or in addition to, the bypass line 72 and flow control device 74 to ensure that fluid continues to flow through the choke manifold 32 during events such as making connections in the drill string 16. In that case, additional sensors may be used to, for example, monitor the pressure and flow rate output of the backpressure pump.

In other examples, connections may not be made in the drill string 16 during drilling. For example, if coiled tubing is used instead of the drill string 16, such connected are not needed. In some embodiments, the drill string 16 could be provided with conductors and/or optical fibers for transmitting data, commands, pressure, etc., between downhole and the surface (e.g., for communication with the sensor 60). As an example, such conductors or fibers may be located in a sidewall or interior of the drill string.

As depicted in FIG. 2, a controller 84 is connected to a control system 86. The controller 84 may correspond to a programmable logic controller or another type of controller capable of controlling operation of drilling equipment. The controller 84 is also connected to the various flow control devices (e.g., devices 34, 74, 81) for regulating flow injected into the drill string 16, flow through the drilling fluid return line 30, and flow between the standpipe injection line 26 and the return line 30.

The control system 86 performs the adaptive learning operations described herein and can include various elements, such as one or more computing devices/processors, a formation pressure model, an adaptive learning module, a database, software in various formats, memory, machine-readable code, etc. These elements and others may be included in a single structure or location, or they may be distributed among multiple structures or locations.

The control system 86 is connected to the sensors 36, 38, 40, 44, 46, 54, 56, 58, 60, 62, 64, 66, 67 which sense respective drilling properties during the drilling operation. In addition, the control system 86 may receive sensor-based formation pressure measurements 87 (e.g., from pressure sensors 142 or logging tools 130 as described in FIG. 5). As discussed above, offset well data, previous operator experience, other operator input, etc., may also be input to the control system 86. The control system 86 may include processor hardware and the associated software, programmable and preprogrammed memory, machine-readable code, etc., for carrying out the adaptive learning as described herein.

The control system 86 may be located at the wellsite, in which case the sensors 36, 38, 40, 44, 46, 54, 56, 58, 60, 62, 64, 66, 67 could be connected to the control system 86 by wires or wirelessly. Alternatively, the control system 86, or any portion of it, could be located at a remote location, in which case the control system 86 could receive data via satellite transmission, the Internet, wirelessly, or by any other appropriate means. The controller 84 can also be connected to the control system 86 in various ways, whether the control system 86 is locally or remotely located.

In one example, data signals from the sensors 36, 38, 40, 44, 46, 54, 56, 58, 60, 62, 64, 66, 67 are transmitted to the control system 86 at a remote location, and the data is analyzed at the remote locations. For example, the analysis may be performed using computing devices/processors, a formation pressure model, an adaptive learning module, a database, software in various formats, memory, and/or machine-readable code, etc. A decision as to how to proceed in the drilling operation may be made automatically based on this analysis, or human intervention may be desirable in some situations. For example, one or more drilling parameters may be varied in response to the analysis.

Instructions as to how to proceed are then transmitted as signals to the controller 84 for execution at the wellsite. Even though all or part of the control system 86 may be at a remote location, the drilling parameter can still be varied in real time in response to measurement of properties of the formation ahead of the bit, since modern communication technologies (e.g., satellite transmission, the Internet, etc.) enable transmission of signals without significant delay.

Figure 3:
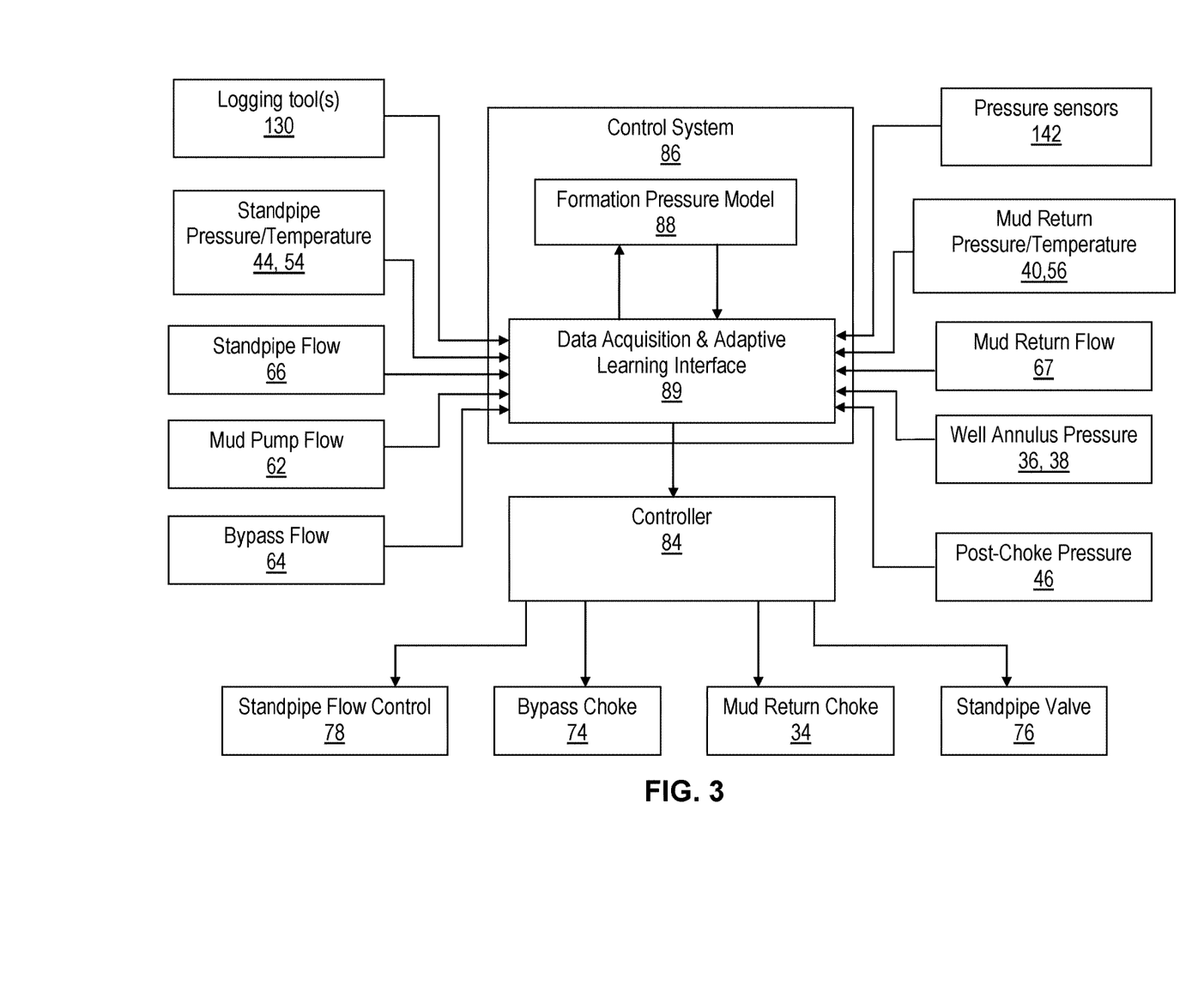
FIG. 3 shows various components for controlling the MPD system of FIG. 2.

FIG. 3 shows various components for controlling the MPD system 10. As discussed for FIG. 2, the MPD system 10 is controlled by control system 86 and controller 84 using predicted model-based pressure measurements, available sensor-based measurements, and an adaptive learning module. The control process may be fully automated to control pressure and flow for an MPD system such as system 10. It should be understood, however, that human intervention may be used, for example, to safeguard against improper operation, to initiate certain routines, and/or to update parameters.

As shown in FIG. 3, the control system 86 includes a formation pressure model 88 and a data acquisition and adaptive learning interface 89. The output of the control system 86 is provided to controller 84 to control various flow and pressure options. Although the control system 86 and the controller 84 are depicted separately in FIGS. 2 and 3, they could be combined into a single element. Further, the functions of control system 86 and controller 84 could be separated into additional elements.

The data acquisition and adaptive learning interface 89 receives input data from various sensors or tools. Without limitation, the sensors include standpipe pressure/temperature sensors 44 and 54, a standpipe flow sensor 66, mud pump sensor 62, bypass flow sensor 64, drill string sensor 60 and Coriolis flow meter 58 (see FIG. 2), post-choke pressure sensor 46, well annulus pressure sensors 36 and 38, mud return flow sensor 40, and mud return pressure/temperature sensors 56 and 67. Logging tool(s) 130 and pressure sensors 142 (e.g., for Geotap, well tests, or pressure build-up analysis) may also provide input to the data acquisition and adaptive learning interface 89. The data acquisition and adaptive learning interface 89 performs adaptive learning operations to update a formation pressure model and/or to update filtering operations (how available sensor-based pressure measurements are used) as described herein. In at least some embodiments, the data acquisition and adaptive learning interface 89 includes one or more modules with adaptive learning instructions executable by a processor.

As an example, the data acquisition and adaptive learning interface 89 may perform the following operations. When real-time data is received, a prediction (e.g., a curve) is computed using a neural network feed forward technique with the latest neural network weights. The prediction is stored, displayed, or otherwise broadcast. Further, the prediction is queued until the actual data related to the prediction is received. The prediction and the actual data are stored in a database, and are considered a "data point". Data points can be used by the data acquisition and adaptive learning interface 89 as part of a training set or validation set, each with corresponding queues. The training set and validation set are used by the data acquisition and adaptive learning interface 89 to update neural network weights. As new data points are added to the training set queue and validation set queue, old data points are removed.

In at least some embodiments, the data acquisition and adaptive learning interface 89 includes or is in communication with a user interface. The user interface enables an operator to add or remove inputs to considered by the adaptive learning process. For example, an operator may use the user interface to direct the data acquisition and adaptive learning interface 89 to predict a particular curve as a function of a subset of available inputs (e.g., drilling parameters, flow control parameters, pressures at different points in the systems, logging parameters, injection and production rates (oil, water, gas), volumes, temperatures at different points in the system, depth). Further, the operator may select the number of hidden layers, the number of neurons per layer, the type of learning to be used (e.g., batch, incremental, batch quickprop), the number of samples, the sample interval, and other control parameters for the adaptive learning process. In at least some embodiments, various control parameters (e.g., including the parameters described for the user interface) of the adaptive learning process may be employed without user input and/or may be part of a default configuration for the adaptive learning process.

Returning to FIG. 3, the formation pressure model 88 (including a hydraulics model) is used in the control system 86 to predict the annulus pressure at or near the surface needed to achieve a desired downhole pressure. In at least some embodiments, well geometry, fluid properties and offset well information (such as geothermal gradient and pore pressure gradient, etc.) are used by the formation pressure model 88 to make ahead of bit pressure predictions. As described herein, the formation pressure model 88 can be updated over time as more sensor-based pressure measurements data becomes available.

In at least some embodiments, the adaptive learning operations performed by the data acquisition and adaptive learning interface 89 include comparing a model-based prediction of pore pressure and fracture pressure with sensor-based measurements for pore pressure and fracture pressure. The difference between the model-based prediction and the sensor-based measurements is a difference or error. The amount of the difference and its sign (positive or negative) can be used to make adjustments to the formation pressure model 88 and/or the filtering operations. Filtering operation updates may include adjusting the data types filtered, the measurements ranges that are considered, or other filter categories. Meanwhile, updates to the formation pressure model 88 may vary depending on the particular model or models used.

As an example, the formation pressure model 88 may include one or more models to take into account hydrocarbon density effect, aquifers, disequilibrium compaction, charged sands, aquathermal pressuring, clay diagenesis, osmosis, evaporative deposits, diagenetic cap-rocks, organic matter transformation, hydrocarbon cracking, tectonics, stress field redistribution, uplift, faults, salt diapirism, and/or mud volcanoes. Additionally or alternatively, the formation pressure model 88 may include one or more models to take into account artificial production, precipitation, potentiometric surface, temperature change, epeirogenic movements, formation foreshortening, decompressional expansion, and/or different densities of oil.

The formation pressure model 88 may include one or more models that use a hydrostatic pressure parameter:

$$P_{hyd} = \rho_f g D_f,  \quad (1)$$

where $\rho_f$ is the average fluid density (Kg/m$^3$), g is the gravitational acceleration (9.81 m/s$^2$, and $D_f$ is vertical height of the fluid column (meters). Further, the formation pressure model 88 may include one or more models that use an overburden stress parameter:

$$S = \sigma + P, \quad (2)$$

where σ is the formation matrix stress and P is the pore pressure. The overburden stress may also be determined as:

$$S = \rho b \cdot \frac{D}{g}, \quad (3)$$

where ρb is the average formation bulk density (g/cm$^3$), D is the vertical thickness of overlying sediment (meters), and g is the gravitational constant. The value ρb can be determined as:

$$\rho b = ((1-\phi)\cdot \rho_m) + (\phi \cdot \rho_f), \quad (4)$$

where $\rho_m$ is the formation matrix density (g/cm$^3$), $\rho_f$ is the formation fluid density, and φ is the porosity overburden pressure. The formation pressure model 88 may include one or more models that use an overburden stress gradient parameter.

In at least some embodiments, the formation pressure model 88 may include one or more models that use a corrected drilling exponent parameter:

$$D_c = \frac{Mw_1}{Mw_2} \cdot d, \quad (5)$$

where $Mw_1$ is the normal hydrostatic gradient for the region, $Mw_2$ is the mud weight or equivalent circulating density (ECD), and d is the formation drillability exponent. The value for $D_c$ can be used to determine pore pressure by analysis of $D_c$ curve shifting, normal compaction trend fitting, and overlay fitting. Such overlay fitting may be calculated using the ratio method or Eaton method.

In at least some embodiments, the formation pressure model 88 may include one or more models that use sigma log calculations, quantitative pore pressure evaluations, compaction trends, and trend shifts. The formation pressure model 88 may also include one or more models that use drilling data such as torque, drag, mud pump pressure, pit levels, flow meters, abnormal trip fill up, direct pressure measurements, and/or differential pressure measurements. Further, in at least some embodiments, the formation pressure model 88 may include one or more models that use background gas, normalized gas, connection gas, trip gas, swab gas, and/or cutting gas.

The formation pressure model 88 may additionally or alternatively include one or more models that use geothermal temperature, geothermal gradient, mud temperature, and/or wireline temperature. Additionally or alternatively, the formation pressure model 88 may include one or more models that use mud conductivity, shale density, mud balance (bulk density), shale factor, and/or cuttings shape.

In at least some embodiments, the formation pressure model 88 may include one or more models that use resistivity/conductivity measurements, delta T sonic measurements, density logs, neutron porosity measurements, gamma ray measurements, repeat formation tests, seismic measurements, pore pressure measurements, compaction trend measurements, overlay calculations, and/or density/sonic crossplots. Additionally or alternatively, the formation pressure model 88 may include one or more models that use fracture gradients, teak off test results, lost circulation, horizontal well stresses, Poisson's ratio, Vshale crossplots, and/or wireline crossplots.

In at least some embodiments, the formation pressure model 88 may include one or more hydraulic models such as REAL TIME HYDRAULICS™ and Drilling Fluids Graphics (DFG™) marketed by Halliburton Energy Services, Inc. of Houston, Tex. USA. Another suitable hydraulics model is provided under the trade name IRIS™, and yet another is available from SINTEF of Trondheim, Norway. Any suitable hydraulics model may be included with formation pressure model 88.

In at least some embodiments, updates to the formation pressure model 88 may involve changing which parameters are used and/or how parameters are weighted. For example, the parameters or weights may be changed in response to comparison results of sensor-based measurements and model-based predictions. Further, the results for different types of pressure predictions may be compared and/or combined in different ways. Accordingly, updates to the formation pressure model 88 may adjust how different types of pressure predictions are compared and/or combined to obtain a model-based pressure prediction.

In at least some embodiments, the data acquisition and adaptive learning interface 89 is integrated with other software such as SENTRY™ and INSITE™ marketed by Halliburton Energy Services, Inc. Any suitable data acquisition and adaptive learning interface may be used in the control system 86 in keeping with the principles of this disclosure.

Returning to FIG. 3, the controller 84 communicates with the data acquisition and adaptive learning interface 89 and operates to maintain a desired setpoint annulus pressure by controlling operation of the mud return choke 34. For example, when an updated desired annulus pressure is transmitted from the data acquisition and adaptive learning interface 89 to the controller 84, the controller 84 uses the desired annulus pressure as a setpoint and controls operation of the choke 34 in a manner to maintain the setpoint pressure in the annulus 20. The setpoint pressure is maintained by increasing or decreasing flow resistance through the choke 34 as needed. More specifically, the choke 34 can be closed more to increase flow resistance, or opened more to decrease flow resistance.

Maintenance of the setpoint pressure is accomplished by comparing the setpoint pressure to a measured annulus pressure (such as the pressure sensed by any of the sensors 36, 38, 40), and decreasing flow resistance through the choke 34 if the measured pressure is greater than the setpoint pressure, and increasing flow resistance through the choke if the measured pressure is less than the setpoint pressure. Of course, if the setpoint and measured pressures are the same, then no adjustment of the choke 34 is required. This process is preferably automated, so that no human intervention is required, although human intervention may be used, if desired. In at least some embodiments, a hydraulic model is employed to calculate annular pressures. For example, the setpoint pressure equation may be equal to the desired annular pressure minus hydrostatic friction minus surge/swab, where the hydraulic model determines the values for hydrostatic friction and surge/swab.

The controller 84 may also be used to control operation of the standpipe flow control devices 76, 78 and the bypass flow control device 74. The controller 84 can thus be used to automate the processes of diverting flow of the fluid 18 from the standpipe line 26 to the bypass line 72 prior to making a connection in the drill string 16, then diverting flow from the bypass line 72 to the standpipe line 26 after the connection is made, and then resuming normal circulation of the fluid 18 for drilling. Again, no human intervention may be required in these automated processes, although human intervention may be used if desired, for example, to initiate each process in turn, to manually operate a component of the system, etc.

In at least some embodiments, the control system 86 determines pore pressure, shear failure pressure, fracture pressure and in-situ stress based on the data received from some or all of the sensors 36, 38, 40, 44, 46, 54, 56, 58, 60, 62, 64, 66, 67. This data can be used to update and refine the formation pressure model 88 over time so that the wellbore pressure can be controlled based on the latest available data, rather than based on pre-drilling assumptions, offset well data, etc.

Figure 4A:
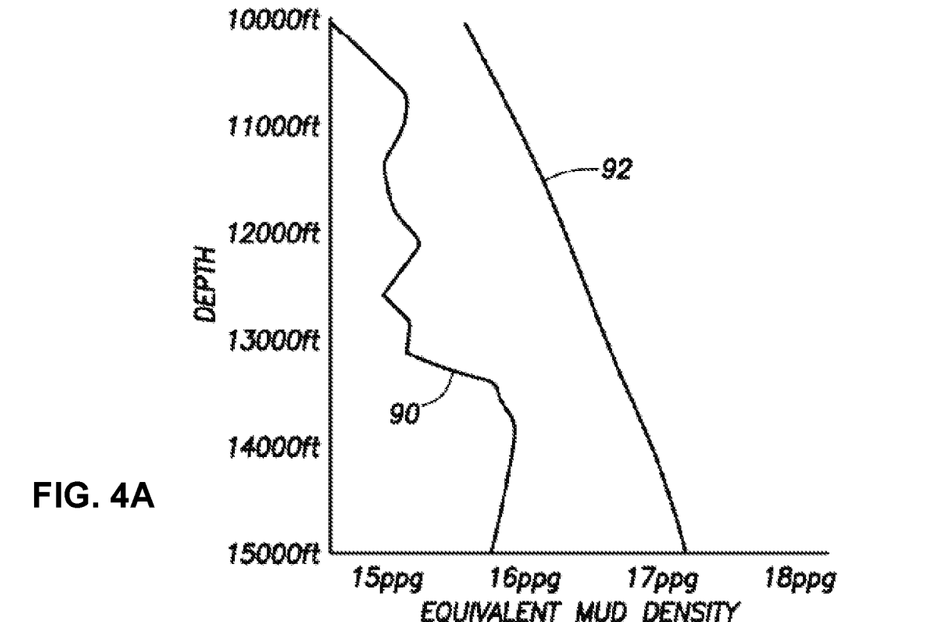
FIG. 4A shows an illustrative prediction graph of pore pressure and fracture pressure as a function of depth.
Figure 4B:
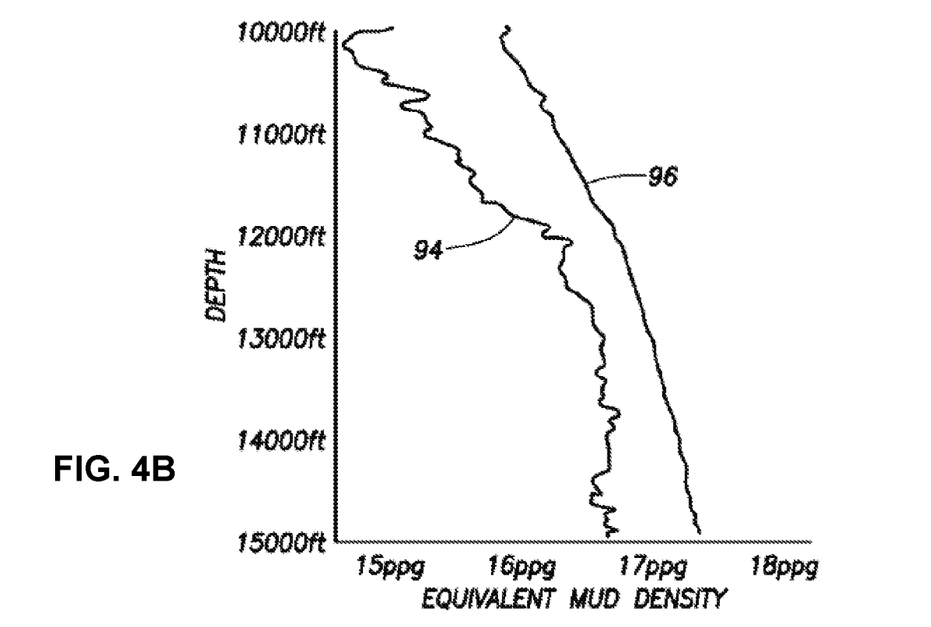
FIG. 4B shows an illustrative measurement graph of pore pressure and fracture pressure as a function of depth.

As an example, a pre-drilling prediction might result in expected pore pressure and fracture pressure curves 90, 92 as depicted in FIG. 4A, whereas the actual pore pressure and fracture pressure curves 94, 96 could turn out to be as depicted in FIG. 4B. In the example of FIGS. 4A and 4B, an operator could make an erroneous decision (such as, where to set casing, etc.) based on an expected margin between pore and fracture pressures 90, 92 at a particular depth, only to find out that the margin is actually much less than what was predicted based on the pre-drilling assumptions, offset well data, etc. If wellbore pressure control is based on inaccurate predictions of pore pressure, shear failure pressure, fracture pressure, in-situ stress, etc., then the problems of fluid influx, shear failure, wellbore collapse, ballooning and/or hydraulic fracturing can occur.

In accordance with at least some embodiments, the adaptive learning operations described herein includes compar-ing a predicted pore pressure curve (e.g., curve 90) with a measured pore pressure curve (e.g., curve 94). Further, a predicted fracture pressure curve (e.g., curve 92) may be compared with a measured fracture pressure curve (e.g., curve 96). The results of the comparison are used to update the formation pressure model 88 and/or to update data filtering operations as described herein. Additionally or alternatively, the adaptive learning operations may compare other parameters such as shear failure pressure and in-situ stress. The comparisons and related updates may occur in real-time or periodically to avoid drilling problems. This will result in greater efficiency and increased production.

It should be clearly understood that the pressure predictions and sensor-based pressure measurements used by the adaptive learning operations may vary. For example, pore pressure and fracture pressure curves can be obtained using different types or combinations of sensor-based measurements. Further, predicted pore pressure and fracture pressure curves can be obtained using different types or combinations of pressure models.

In one example, the wellbore pressure is controlled automatically in real-time based on the determinations of pore pressure, shear failure pressure, fracture pressure and in-situ stress. The control system 86 could, for example, be programmed to maintain the wellbore pressure at 25 psi (~172 kpa) greater than the maximum pore pressure of the formation exposed to the wellbore 12. As the wellbore 12 is being drilled, the actual pore pressure curve 94 is continuously (or at least periodically) updated and, as a result, the wellbore pressure is also continuously varied as needed to maintain the desired margin over pore pressure.

Additionally or alternatively, the control system 86 could be programmed to maintain a desired margin less than fracture pressure and greater than shear failure pressure. An alarm could be activated whenever one of the margins is not present and, although the control system 86 could be entirely automated, human intervention could be interposed as appropriate.

In accordance with at least some embodiments, the control system 86 supplies a pressure setpoint to the controller 84, which operates the flow control devices 34, 74, 81 as needed to achieve or maintain the desired wellbore pressure. The setpoint will vary over time, as the determinations of actual pore pressure, shear failure pressure, fracture pressure and in-situ stress are updated. For example, using the formation pressure model along with the latest data obtained from the sensors 36, 38, 40, 44, 46, 54, 56, 58, 60, 62, 64, 66, 67, it may be determined that a pressure of 500 psi (~3445 kpa) should be applied in the annulus 20 at the surface to produce a desired annular pressure. The controller 84 can operate the flow control devices 34, 74, 81 as needed to achieve and maintain this desired annulus pressure.

If the sensor 60 is capable of transmitting real-time or near real-time annular pressure measurements, then the controller 84 can operate the flow control devices 34, 74, 81 as needed to achieve and maintain a desired annular pressure as determined by the control system 86. The annulur pressure setpoint or bottomhole pressure setpoint will be continuously (or at least periodically) updated using the formation pressure model 88 along with the latest data obtained from the sensors 36, 38, 40, 44, 46, 54, 56, 58, 60, 62, 64, 66, 67.

Figure 5:
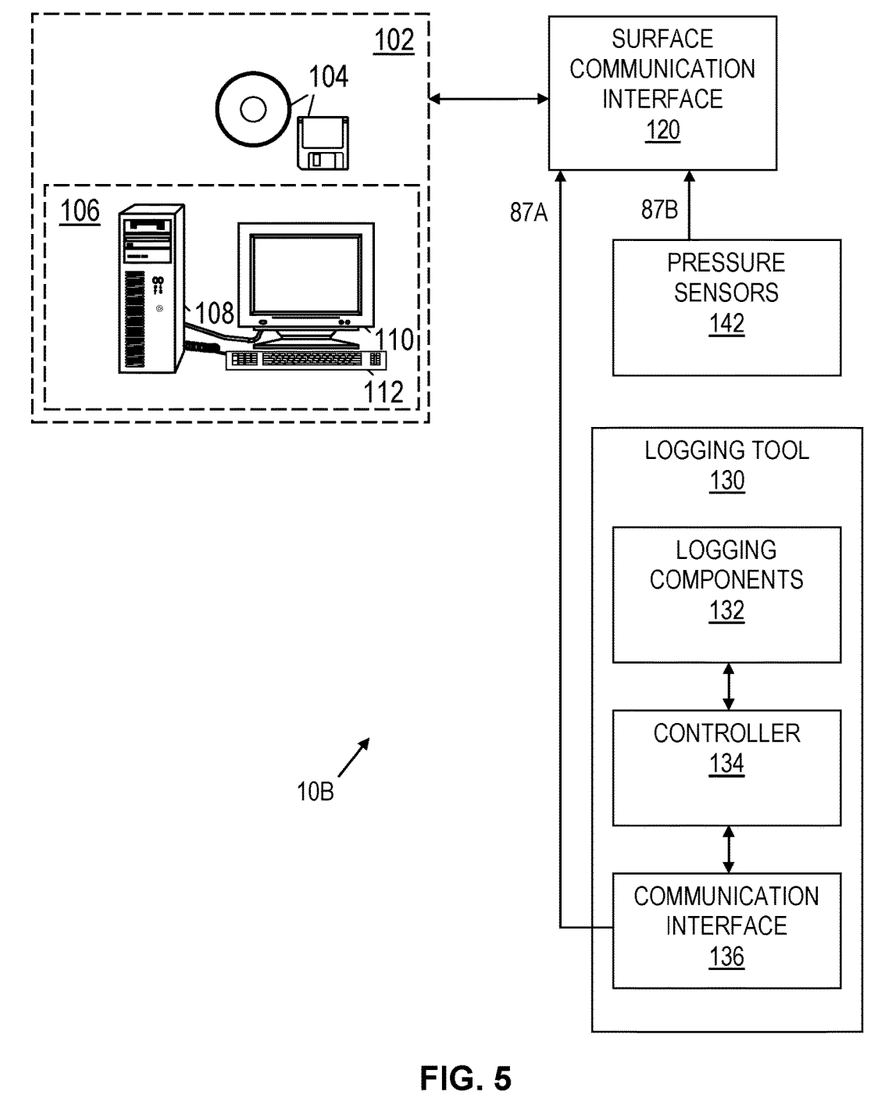
FIG. 5 shows illustrative components of a borehole pressure management system.

FIG. 5 shows an illustrative MPD system 10B with a computer system 102 and measurement components such as pressure sensors 142 and logging tool 130. In system 10B, measurements collected from the logging tool 140 and pressure sensors 142 are processed by the computer system 102. For example, the computer system 102 may execute software corresponding to the formation pressure model 88, the data acquisition and adaptive learning interface 89, and/or the controller 84 described in FIGS. 2 and 3. Other sensors may provide input to computer system 102 for adaptive learning operations as described herein.

The computer system 102 may correspond to, e.g., an onsite facility for the MPD system 10B of FIG. 5 or system 10 of FIG. 2, or a remote computing system that receives measurements from such facilities. The computer system 102 may include wired or wireless communication interfaces for receiving measurements for pressure sensors 142 and/or logging tool 130. The measurements from the pressure sensors 142 and/or the logging tool 130 are used by the data acquisition and adaptive learning interface 89 to perform various adaptive learning operations including formation pressure model update operations and data filtering update operations as described herein.

As shown, the illustrative computer system 102 comprises user workstation 106 with a computer chassis 108 coupled to a display device 110 and a user input device 112. The display device 110 and user input device 112 enable an operator, for example, to interact with software executed by the workstation 106 (e.g., control system 86 or related modules). The computer chassis 108 includes one or more information storage devices 104 for accessing software related to control system 86. Without limitation, the information storage devices 104 are shown in FIG. 5 in the form of removable, non-transitory information storage media (e.g., optical media disks, drives, etc.). Such software may also be downloadable software accessed through a network such as the Internet). Of course, the computer system 102 also includes one or more processors (not shown) to execute software from storage devices 104 and/or downloaded software.

The pressure sensors 142 represent various available sensor-based measurements to determine pressure. Without limitation, the pressure sensors 142 may enable Geotap measurements, well tests, and/or pressure build-up analysis. The raw measurements processed measurements from pressure sensors 142 may be received by a surface communication interface 120 and provided to the computer system 102 for further analysis and use.

The logging tool 130 may correspond to one or more logging while drilling (LWD) or wireline logging tools to collect resistivity/conductivity measurements, delta T sonic measurements, density logs, neutron porosity measurements, gamma ray measurements, repeat formation tests, seismic measurements, pore pressure measurements, compaction trend measurements, overlay calculations, and/or density/sonic crossplots.

As shown, the logging tool 130 includes logging components 132 such as signal sources, signal receivers, instrumentation, and electronics. The logging tool 130 also includes a controller 134 to direct various operations of the logging tool 130. The operations include setting or adjusting parameters for collecting raw data, processing the raw data, storing the raw and/or processed data, and transmitting the raw and/or processed data to the surface. A communication interface 136 of the logging tool 130 enables measurement data to be transferred to a surface communication interface 120. The logging tool 130 and surface communication interface 120 provides the measurement data to the surface computer 102 using known communication techniques (e.g., mud pulse, electromagnetic signaling, or a wired pipe arrangement). It should be understood that the measurement data provided to the surface computer 102 from the logging tool 130 may include raw measurement data, processed measurement data, inverted measurement data, or other data.

Figure 6:
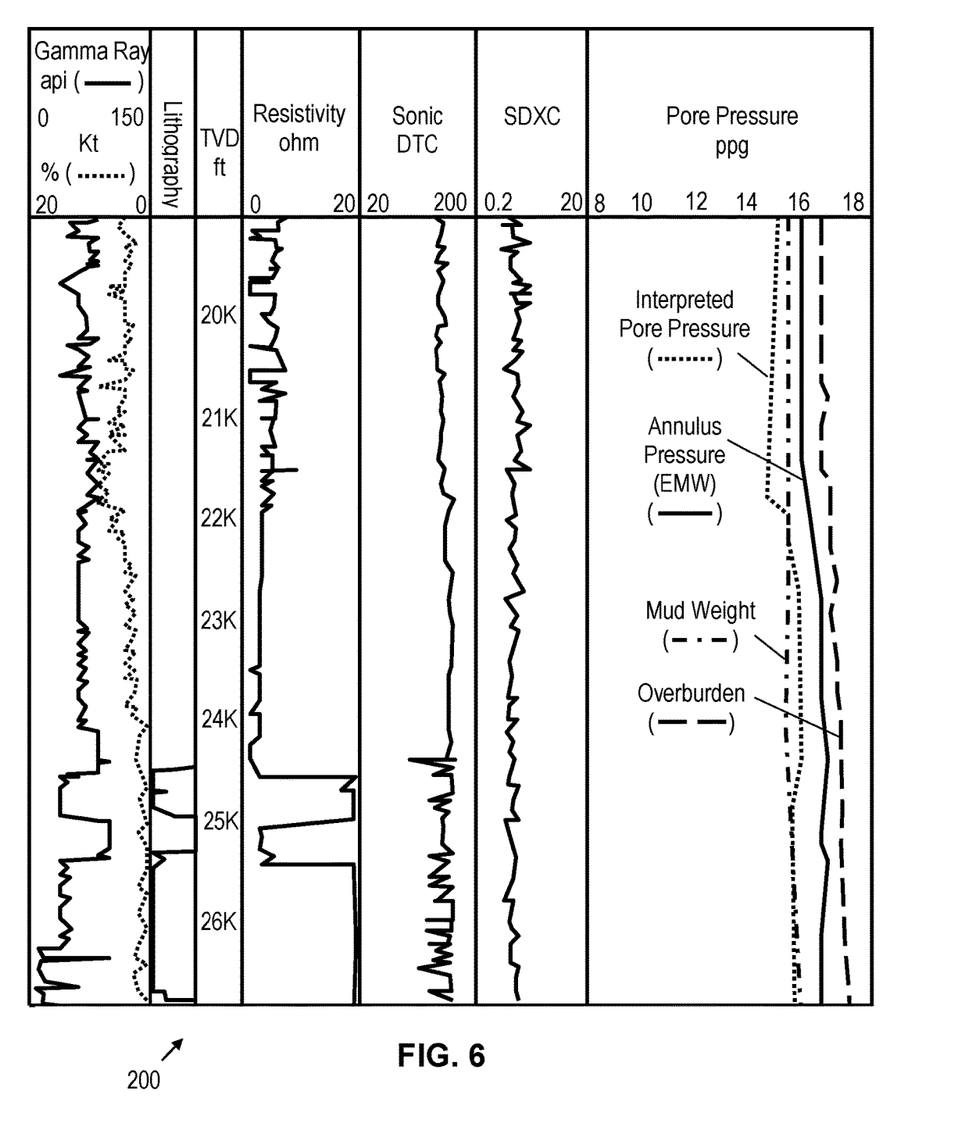
FIG. 6 shows a block diagram of an illustrative log report.

FIG. 6 shows a block diagram of an illustrative log report 200. The log report 200 may be generated based on raw measurements and/or processed measurements from sensors 36, 38, 40, 44, 46, 54, 56, 58, 60, 62, 64, 66, 67, pressure sensors 142 and/or logging tools 130 as described herein. In log report 200, various logs are represented as a function of depth. More specifically log report 200 shows a gamma ray log, a torsional vibration (Kt) log, a lithography log, a resistivity log, a sonic delay-time compressional (DTC) log, a shifted D exponent curve (SDXC) and a pore pressure log.

In accordance with at least some embodiments, the log report 200 can be used by an operator to manually evaluate measurement-based pressure and/or model-based pressure. This is possible due to predetermined relationships between pressure and different types of log data. With the log report 200, an operator may provide input to control system 86 and/or controller 84 to update MPD operations. Further, an operator may adjust formation pressure model update operations and/or the data filtering operations. Additionally or alternatively, a computer system (e.g., computer system 102) may analyze the data corresponding to the log report 200 to make adjustments to the control system 86, the controller 84, the formation pressure model 88, event signatures, the filtering operations, and/or the data acquisition and adaptive learning interface 89.

FIG. 7 shows an illustrative event signature chart 250. The event signatures represented in chart 250 may be integrated with the adaptive learning operations and/or may be separate from the adaptive learning operations described herein. When an event signature match (or at least a partial match) occurs, an alarm, alert, warning, display of information, etc. may be provided. At a minimum, occurrence of an event should be recorded for later use and analysis.

In FIG. 7, four example event signatures are representatively tabulated, along with parameter behaviors which correspond to signature elements. In practice, many more event signatures may be provided, and more or less behaviors may be used for identifying signature elements. Note that each event signature is unique. Thus, a kick (influx) event is indicated by a particular combination of parameter behaviors, whereas a fluid loss event is indicated by another particular combination of parameter behaviors.

If, during a drilling operation, a signature is generated which matches (or at least partially matches) any of the event signatures shown in FIG. 7, an indication will be provided that the corresponding event is occurring. This can happen even without any human intervention and can be used to control MPD operations. For example, if a kick event is indicated, the choke 34 can be adjusted in response to increase pressure applied to the annulus 20 in the MPD system 10. If fluid loss is detected, choke 34 can be adjusted to decrease pressure applied to the annulus 20. If a drill pipe connection is starting, the flow control devices 81, 74 can be appropriately adjusted to maintain a desired pressure in the annulus 20 during the connection process, and when completion of the drill pipe connection is detected, the flow control devices can be appropriately adjusted to restore circulation flow through the drill string 16 in preparation for drilling ahead.

In accordance with at least some embodiments, such event signatures are subject to adaptive learning operations as described herein to improve accuracy of signature elements as more information is collected. For example, signature elements for different event signatures may be filtered or weighted by comparing the difference between predicted signature elements and sensor-based signature elements.

Figure 8:
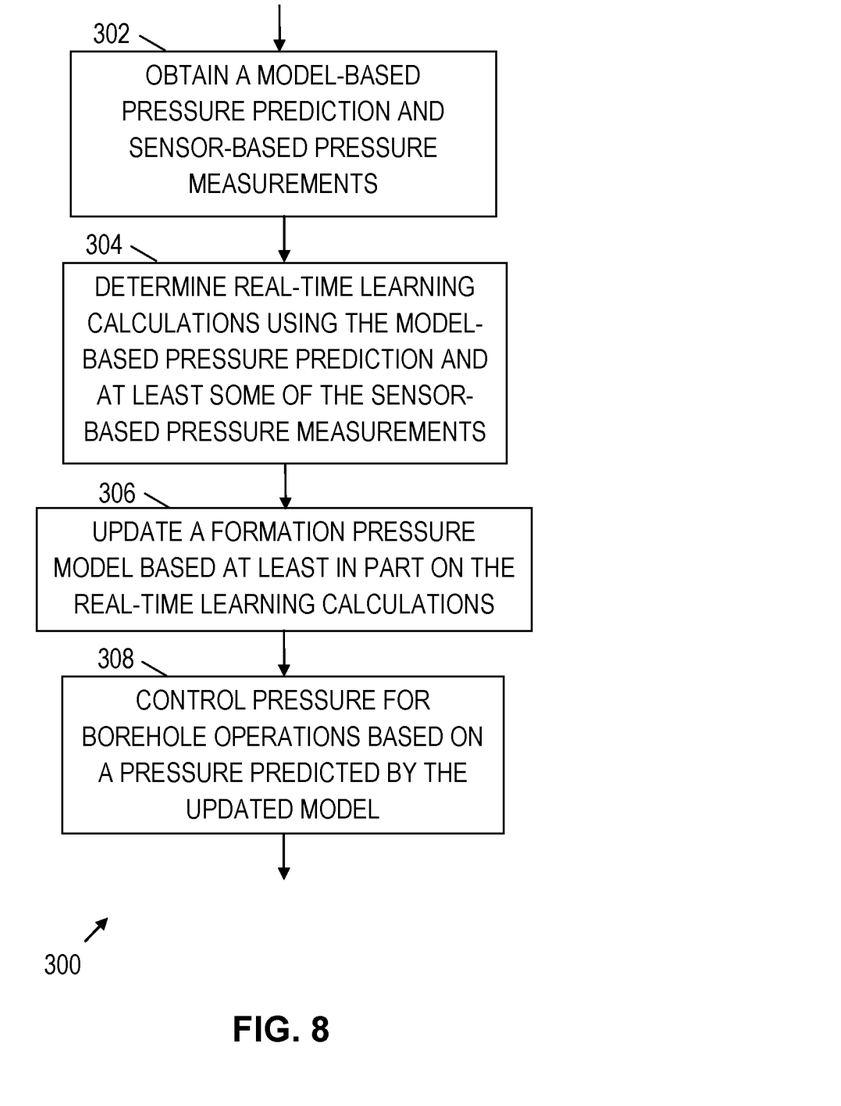
FIG. 8 shows an illustrative borehole pressure management method.

FIG. 8 shows an illustrative borehole pressure management method 300. The method 300 may be performed, for example, by the monitoring/control system 4 of FIG. 1, the control system 86 of FIGS. 2 and 3, or the computer system 102 of FIG. 5. As shown, the method 300 includes obtaining a model-based pressure prediction and sensor-based pressure measurements during operations in the borehole (block 302). For example, the predictions and measurements may correspond to pore pressure and fracture pressure curves. There are various ways to determine pressure from sensor-based measurements as described herein. If multiple sensor-based pressure measurements are available, these available measurements may be combined. For example, filtering, averaging or weighting techniques may be applied to available sensor-based pressure measurements. At block 304, real-time learning calculations are determined using the model-based pressure prediction and at least some of the sensor-based pressure measurements. In at least some embodiments, the real-time learning calculations may use a neural network to compare predicted pressures with the one or more sensor-based pressure measurements. In at least some embodiments, the real-time learning calculations are obtained using a neural network (or other learning algorithm) to compare the predicted borehole path pressure with the one or more sensor-based pressure measurements. The difference (or error) between the predicted borehole path pressure and the one or more sensor-based pressure measurements corresponds to is further processed to obtain the real-time learning calculations. The real-time learning calculations can also be used to update how available sensor-based pressure measurements are used. In other words, the filtering, averaging or weighting techniques for available sensor-based pressure measurements may be adjusted at least in part using the real-time learning calculations. At block 308, pressure for borehole operations is controlled based on a pressure predicted by the updated formation pressure model. The method 300 can be repeated as needed while performing borehole operations such as MPD, cementing, casing, and tripping. Further, updated formation pressure models can be stored and organized for use as baseline models for future borehole operation projects.

Numerous other modifications, equivalents, and alternatives, will become apparent to those skilled in the art once the above disclosure is fully appreciated. For example, while the foregoing adaptive learning techniques have been described for a single-gradient environment, it should be understood that the same or similar techniques could be applied to a multi-gradient environment (e.g., a dual-gradient drilling environment). It is intended that the following claims be interpreted to embrace all such modifications, equivalents, and alternatives where applicable.

What is claimed is:

1. A method of managing pressure in a borehole, the method comprising:
    obtaining a model-based pressure prediction and sensor-based pressure measurements during operations in the borehole;
    determining real-time learning calculations based at least in part on a difference between the model-based pressure prediction and real-time feedback from at least some of the sensor-based pressure measurements;
    updating formation pore pressure, fracture pressure, shear failure pressure, and in-situ stress predictions based at least in part on the real-time learning calculations and on compaction trend data filtered by an adaptive learning module in real-time; and
    controlling flow rate, choke pressure, and drill rates in real-time for the operations based on the predictions.

2. The method of claim 1, wherein determining the real-time learning calculations comprises:
    comparing a model-based pore pressure curve prediction with a sensor-based pore pressure measurement curve; and
    comparing a model-based fracture pressure curve prediction with a sensor-based fracture pressure measurement curve.

3. The method of claim 1, further comprising filtering the obtained sensor-based pressure measurements using the adaptive learning module and determining the real-time learning calculations based on a filtered set of sensor-based pressure measurements.

4. The method of claim 3, wherein the adaptive learning module includes a neural network.

5. The method of claim 3, wherein the filtered set of sensor-based pressure measurements includes look-ahead log data and look-around log data.

6. The method of claim 3, wherein the filtered set of sensor-based pressure measurements includes log data selected from the group consisting of: resistivity log data, acoustic log data, density log data, neutron density log data, gamma ray log data, and seismic log data.

7. The method of claim 1, further comprising generating a log that displays pore pressure and at least one logging tool measurement as a function of depth, wherein an operator updates the predictions based at least in part on the generated log.

8. The method of claim 1, wherein the updated formation pore pressure, fracture pressure, shear failure pressure, and in-situ stress predictions are based at least in part on historical pressure test data filtered by the adaptive learning module.

9. The method of claim 1, wherein the updated formation pore pressure, fracture pressure, shear failure pressure, and in-situ stress predictions are based at least in part on real-time pressure test data filtered by the adaptive learning module.

10. The method of claim 1, wherein the updated formation pore pressure, fracture pressure, shear failure pressure, and in-situ stress predictions are based at least in part on event signature data filtered by the adaptive learning module.

11. The method of claim 1, further comprising repeating said obtaining steps, said determining step, said updating step, and said controlling step, during the borehole operations.

12. A system for managing pressure in a borehole, comprising:
    a controllable choke unit to adjust pressure in the borehole; and
    a processor that:
        determines real-time learning calculations based at least in part on a difference between a model-based pressure prediction and real-time feedback from sensor-based pressure measurements obtained during borehole operations;
        updates formation pore pressure, fracture pressure, shear pressure, and in-situ stress predictions based at least in part on the real-time learning calculations and on compaction trend data filtered by an adaptive learning module in real-time;
        determines a pressure setpoint using the updated predictions in real time; and provides the pressure setpoint to the controllable choke unit which controls a choke in real-time.

13. The system of claim 12, wherein the processor determines the real-time learning calculations by comparing a model-based pore pressure curve prediction with a sensor-based pore pressure measurement curve, and by comparing a model-based fracture pressure curve prediction with a sensor-based fracture pressure measurement curve.

14. The system of claim 12, wherein the processor filters sensor-based pressure measurements using the adaptive learning module, and determines the real-time learning calculations based on a filtered set of sensor-based pressure measurements.

15. The system of claim 12, wherein the sensor-based pressure measurements correspond to look-ahead look-around log data filtered by the adaptive learning module.

16. The system of claim 12, wherein the sensor-based pressure measurements correspond to log data filtered by the adaptive learning module, the log data selected from the group consisting of: resistivity log data, acoustic log data, density log data, neutron density log data, gamma ray log data, and seismic log data.

17. The system of claim 12, wherein the processor generates a log that displays pore pressure in real-time and at least one logging tool measurement as a function of depth, and updates the predictions in real-time based at least in part on operator input in response to the generated log.

18. The system of claim 12, wherein the updated formation pore pressure, fracture pressure, sheer failure pressure, and in-situ stress predictions are based at least in part on data filtered by the adaptive learning module, the data selected from the list consisting of: historical pressure test data, real-time pressure test data, and event signature data.

* * * * *